(12) United States Patent
Lefloch

(10) Patent No.: US 8,683,581 B2
(45) Date of Patent: Mar. 25, 2014

(54) METHOD FOR AUTHENTICATING A TERMINAL

(75) Inventor: Dominique Lefloch, Paris (FR)

(73) Assignee: Nagravision S.A., Cheseaux-sur-Lausanne (CH)

(*) Notice: Subject to any disclaimer, the term of this patent is extended or adjusted under 35 U.S.C. 154(b) by 102 days.

(21) Appl. No.: 13/309,176

(22) Filed: Dec. 1, 2011

(65) Prior Publication Data
US 2012/0144479 A1 Jun. 7, 2012

Related U.S. Application Data

(60) Provisional application No. 61/421,220, filed on Dec. 9, 2010.

(30) Foreign Application Priority Data

Dec. 1, 2010 (EP) .................................... 10193254

(51) Int. Cl.
G06F 7/04 (2006.01)
G06F 12/00 (2006.01)
G06F 12/14 (2006.01)
G06F 13/00 (2006.01)
G06F 17/30 (2006.01)
G06F 7/00 (2006.01)

(52) U.S. Cl.
USPC .................................... 726/20; 726/4; 726/27

(58) Field of Classification Search
USPC ......................................... 726/22–25, 34–36
See application file for complete search history.

(56) References Cited

U.S. PATENT DOCUMENTS

| 6,308,270 | B1 | 10/2001 | Guthery |
| 7,516,444 | B2* | 4/2009 | Perlin et al. ................... 717/125 |
| 7,703,086 | B2* | 4/2010 | Odinak et al. ................ 717/146 |
| 7,711,779 | B2 | 5/2010 | Goodman et al. |

(Continued)

FOREIGN PATENT DOCUMENTS

| EP | 0735507 | 10/1996 |
| EP | 1078524 | 2/2001 |

(Continued)

OTHER PUBLICATIONS

European Search Report issued in EP 10 19 3254, dated Mar. 11, 2011.

(Continued)

*Primary Examiner* — Linglan Edwards
*Assistant Examiner* — Vu V Tran
(74) *Attorney, Agent, or Firm* — DLA Piper LLP US

(57) ABSTRACT

The invention provides a system, a secure device and a method for authenticating dynamically a host device with a secure device without modifying hardware or basic functional software of the host device. An authentication engine implemented in the secure device allows detecting non-authorized host devices or illegal secure devices environment. The secure device is locally connected to the host device comprising at least one processor configured for handling a plurality of hardware or software parameters defining the functioning behavior of the host device. A memory associated to the processor stores a plurality of reference hardware and software parameters. The secure device monitors the behavior of the host device both in terms of hardware and software. After comparison with the reference parameters, the host device is considered as authentic or authorized only when the values of counters associated to the hardware and software parameters are within an acceptable.

23 Claims, 1 Drawing Sheet

(56) References Cited

U.S. PATENT DOCUMENTS

| | | |
|---|---|---|
| 7,739,514 B2 | 6/2010 | Bangui |
| 7,848,501 B2 | 12/2010 | Goodman et al. |
| 7,971,785 B2 | 7/2011 | Naccache |
| 2002/0095591 A1* | 7/2002 | Daniell et al. ............... 713/200 |
| 2003/0023863 A1* | 1/2003 | El Fassi et al. .............. 713/200 |
| 2005/0021649 A1 | 1/2005 | Goodman et al. |
| 2006/0053295 A1* | 3/2006 | Madhusudan et al. ........ 713/181 |
| 2006/0085645 A1 | 4/2006 | Bangui |
| 2006/0190726 A1 | 8/2006 | Brique et al. |
| 2006/0195604 A1 | 8/2006 | Goodman et al. |
| 2006/0217973 A1* | 9/2006 | Gao et al. .................... 704/221 |
| 2008/0052774 A1* | 2/2008 | Chesla et al. ................ 726/13 |
| 2008/0071728 A1* | 3/2008 | Lim .............................. 707/1 |
| 2008/0252309 A1* | 10/2008 | Gross et al. .................. 324/750 |
| 2009/0021418 A1* | 1/2009 | Winstead ...................... 342/91 |
| 2009/0106563 A1* | 4/2009 | Cherpantier ................. 713/194 |
| 2009/0113530 A1* | 4/2009 | Brainard et al. .............. 726/6 |
| 2009/0200372 A1 | 8/2009 | Naccache |
| 2009/0238083 A1* | 9/2009 | Yoshida ....................... 370/242 |
| 2009/0249443 A1* | 10/2009 | Fitzgerald et al. ............ 726/2 |
| 2009/0293051 A1* | 11/2009 | Krywaniuk ................... 717/173 |
| 2010/0313270 A1* | 12/2010 | Kim et al. .................... 726/24 |
| 2011/0010775 A1* | 1/2011 | Modave et al. ............... 726/26 |
| 2011/0093703 A1* | 4/2011 | Etchegoyen ................. 713/168 |
| 2011/0213878 A1* | 9/2011 | Karl et al. .................... 709/224 |
| 2011/0246833 A1* | 10/2011 | Bockhaus et al. ............ 714/37 |
| 2011/0307724 A1* | 12/2011 | Shaw et al. .................. 713/323 |
| 2013/0024936 A1* | 1/2013 | Jakobsson et al. ............ 726/23 |

FOREIGN PATENT DOCUMENTS

| | | |
|---|---|---|
| EP | 1496655 | 1/2005 |
| EP | 1529369 | 5/2005 |
| EP | 1684206 | 7/2006 |
| EP | 2091028 | 8/2009 |
| WO | WO 97/00483 | 1/1997 |
| WO | WO 99/57901 | 11/1999 |
| WO | WO 03/107585 | 12/2003 |
| WO | WO 2004/059450 | 7/2004 |
| WO | WO 2009/103136 | 8/2009 |
| WO | WO 2009/149965 | 12/2009 |

OTHER PUBLICATIONS

English language abstract of EP 2091028, published Aug. 19, 2009.
English language abstract of EP 0735507, published Oct. 2, 1996.

* cited by examiner

METHOD FOR AUTHENTICATING A TERMINAL

CROSS REFERENCE TO RELATED APPLICATIONS

This application claims priority under 35 U.S.C. Section 119 to U.S. Provisional Application No. 61/421,220, entitled "Method for authenticating a terminal" filed Dec. 9, 2010, and to European Patent Application EP10193254.9 entitled "Method for authenticating a terminal" filed Dec. 1, 2010, the contents of which are hereby incorporated by reference herein.

FIELD OF THE INVENTION

The invention relates to a system and a method for authenticating a host device such as a terminal with a secure device locally connected to the host device. The method applies preferably between a pay TV set top box and a security module such as a smart card.

TECHNICAL BACKGROUND

Most of the known authentication methods are based on exchange of secret keys, device identifiers or random numbers between a host device and a security module. The two examples below concern pairing mechanisms used for associating a security module to a given terminal and for securing data transmission between the security module and the terminal.

Document EP1078524B2 disclose a pairing mechanism between two devices such as a receiver and a security module based on the one hand on ciphering and deciphering the data exchanged between the receiver and the security module with a unique key stored in a memory of one of the two devices and on the other hand on a serial number of the receiver stored in the security module.

Document EP1529369B1 disclose another method of pairing two devices locally connected to one another. The first device is a security module containing a first encrypting key, as a private key of a pair of asymmetric encrypting keys. The second device is a receiver comprising at least one second encrypting key as a public key of the pair of asymmetric encrypting keys. Furthermore each of the devices comprises a symmetrical key. The security module generates a first random number, which is encrypted by the private key, then transmitted to the receiver, in which it is decrypted by means of the public key. The receiver generates a second random number, which is encrypted by the public key, then transmitted to the security module, in which it is decrypted by means of the private key. A session key used for safe data exchange is generated by a combination of the symmetric key and the random numbers generated and received by each of the devices.

In further authentication techniques, the terminal comprises means for distinguishing original cards from clones or emulators and is able to check authenticity of the card before starting any process implying sensitive data.

Document EP2091028A1 describes a method for authenticating micro-processor cards to determine whether a card is a genuine card, supplied by an authorized distributor, or a fake card, known as a clone, supplied by an unauthorized third party, by a checking program of at least one card reader terminal, said program sending to each card commands belonging to a standard and public set of commands. The method thus enables a verification of the authenticity of a chip card based on the recognition and/or processing by the chip card of a secret command different from standardized or public commands and transmitted by a card reader terminal. Since the secret command is pre-inserted into each genuine chip card, only a genuine chip card can correctly recognize and/or process said secret command when it is transmitted by a card reader terminal. The presence of a cloned card is therefore detected when a chip card cannot correctly recognize and/or process said secret command even if the cloned card reacts correctly to public commands.

Document WO2009103136A2 discloses a method and equipment to indicate adulteration in a card reading terminal, based on the identification of alterations in the electrical characteristics of the terminal. Such adulteration consists in the fraudulent installation, inside the terminal, of a collecting device which stores the information and the passwords of the cards that are processed by the terminal, where such data is subsequently used for cloning cards. The said electrical characteristics comprise, among others, alterations in the voltage values measured between certain pins of the external connector of the terminal, the said alterations being the consequence of the fraudulent installation of the said device. The equipment indicates the presence of the collecting device by means of activation of an indicator light, such as a LED.

The authenticity of a terminal and the applications installed therein may also be checked to ensure conformity of associated chip cards which send instructions to the terminal for verifying integrity of a particular application.

Document WO2004/059450A1 discloses a method of verifying the integrity of a software application that can be executed on a host terminal including steps of determining at least one series of control instructions forming an executable certificate for the software application, which can be executed by the host terminal during execution of the software application to be verified; on the host terminal, executing the software application to be verified, receiving the executable certificate determined during the first step and executing the series of control instructions for the certificate which can be executed in the memory context of the host terminal; comparing the result thus obtained through execution of the control instructions with the result expected from an authentic software application; and in the event of a positive comparison, continuing with the execution of the software application to be verified. According to another embodiment, in which the execution of the software application resorts to a smart card or any other secure circuit to operate, the series of control instructions is housed in the smart card and sent to the software application to be verified, the software application being capable of recovering and executing said series of control instructions thus sent with the data which it needs to operate. In practice, access to data transmitted by the smart card must be necessary to the software application to be verified for this to behave in an identical manner to an authentic application.

Document U.S. Pat. No. 6,308,270B1 discloses a method of validating execution of a software program. The method includes executing the software program on a computer, sending information from the computer to a smart card during execution of the software program, verifying in the smart card information received from the computer, and storing a signal in the smart card indicative of whether execution of the software program is certified as valid. One or more control values can be sent from the smart card to the computer in response to verifying the information received from the computer. A control value can be used to determine when subsequent information will be sent from the computer to the smart card during execution of the software program. The smart card can determine whether the software program responds correctly to the one or more control values. The frequency with which the computer sends information to the smart card can depend upon the control values. The smart card can also verify that the order in which information is received from the computer is correct.

Further techniques to prevent frauds and overload of communication channels or networks are based on measuring a quantity of data exchanged between a provider and a receiver such as a number of e-mail messages, transactions statistics, or an amount of downloaded and stored data. These techniques do not concern an authentication of a host unit where a security module monitors the host unit on which it is connected in order to avoid using cloned or non authorized host units.

Document EP1496655A2 discloses a system and method that facilitates detecting and preventing spam in a variety of networked communication environments. In particular, several techniques are provided for monitoring outgoing communications such as email, instant messaging, whisper-chat room, and/or chat room messages to identify potential spam senders, also referred to as spammers. Spammers often attempt to take advantage of legitimate Internet Service Providers (ISPs) or other messaging services by using such services to send their spam. This, however, can seriously increase the bandwidth of the ISPs as well as increase their support costs and decrease their reputation as a trusted source of messages which can impede their ability to get legitimate messages delivered. The system identifies potential spammers by examining users' outgoing messages—as opposed to incoming messages. One technique involves tracking sender message volumes and/or recipient counts. For example, the ISP server(s) called to send a message can keep a count of the number of messages sent by a particular user. Alternatively, the ISP server(s) can examine the "To" and "cc" (carbon copy) lines of a message to count the number of recipients for that particular message. These types of counts can be tracked over a period of time or a total count of messages the user ever sent can be obtained. This technique is particularly useful because most spammers send messages to a relatively large number of recipients while legitimate users usually send messages to a relatively small number of recipients.

Document WO97/00483A1 discloses a system and a process for inputting client transaction data for a particular industry, organizing client transactional data into a three dimensional array, generating statistical values for each entity-criterion over time by measuring Value (v), Normalcy (n) and Change (d), weighting each statistical value and summing all values to form a single entity-criterion score, weighting each entity-criterion score and summing all entity-criterion scores to form a single entity score, comparing the entity score to a pre-determined threshold, and displaying the entities so that those engaging in fraudulent behavior are easily identified.

Document WO2009/149965A2 discloses a system for monitoring a security-related system with a monitoring device on which a first process occurs, which generates a monitoring result which is transmitted to another device that forms at least part of the security-related system. A second monitored process of the security-related system returns the received monitoring result to the first process for testing in order to calculate a processing result.

Document EP1684206A2 discloses a system and/or a method that facilitate monitoring user account activity for suspicious behavior to mitigate storage abuse. More specifically, the system and method can impose a cost on the user (user account) when suspicious behavior is detected. Such behavior can be determined in part by measuring the outbound volume of stored data at any given time or over a period of time. When the volume of outbound stored data satisfies a threshold, a cost can be imposed on the user.

SUMMARY OF THE INVENTION

An aim of the invention is to provide a system configured for dynamically authenticating a host device such as a terminal with a secure device such as a smart card without modifying hardware or basic functional software of the host device. Another aim is to detect non authorized host devices or illegal secure devices environment thanks to an authentication engine implemented in the secure device.

These aims are achieved by a system for authenticating a host device with a secure device comprising a host device and a secure device locally connected to said host device, said secure device comprising at least one processor configured for handling a plurality of hardware and software parameters specific to the operating behavior of the host device, the hardware parameters including parameters pertaining to the electric functioning of the host device, the software parameters depending on operating of data processing programs implemented in processors and associated memories of the host device, the secure device further comprising a non volatile memory associated to the processor, for storing a plurality of reference hardware and software parameters, wherein the secure device is configured for performing authentication of the host device by:

a) determining at least one hardware or software parameter specific to the operating behavior of the host device,
b) comparing the at least one hardware or software parameter with a corresponding reference hardware or software parameter stored in the non volatile memory,
c) according to the comparison results, modifying or leaving unchanged a value of a counter associated to the at least one hardware or software parameter,
d) repeating the steps a) to c) after at least one time period,
e) after the at least one time period, reading the value of the counter corresponding to the at least one hardware or software parameter,
f) comparing the value of the counter with a predefined counter threshold value specific to the host device and according to the result of the comparison, determining an operating mode of the system comprising one of further processing, repeating authentication process or executing countermeasures by the secure device and/or the host device.

A further object of the invention is a method for authenticating a host device by a secure device locally connected to said host device carrying out steps according to claim 18.

A further object of the invention is a secure device configured to authenticate a host device locally connected to the secure device. The secure device is provided with features defined according to claim 21.

A secure device can be implemented in a variety of manners such as on a microprocessor card, a smartcard or any electronic module in the form of a dongle. These modules are generally portable and detachable from the host device. The most commonly used are smart cards having electrical contacts arranged according ISO 7816 standard, but contactless smart cards of type ISO 14443 are more and more frequently used. Another implementation of the secure device consists of an integrated circuit plugged on a socket or on a connector like a SIM module connector inside the host device.

The host device is defined as a unit for processing payload data accompanied by various information data such as a multimedia processing unit, a pay TV set top box, a desktop or portable personal computer, a mobile terminal such as a smart phone or a personal digital assistant PDA, etc. A conditional Access Module CAM as described in document EP0735507B1 may also be considered as host device. It resides on a contact unit in the form of a flat housing according to the PCMCIA standard, designed to hold and to be connected to a smart card. The CAM module is inserted in a host apparatus such as a set top box, a desktop or portable personal computer or a TV set equipped with an appropriate interface.

According to the method of the invention, the secure device monitors the behavior of the host device both in terms of hardware and software. The host device is then considered as authentic or authorized only when the values of the counters are within an acceptable range which is defined by preliminary tests. When some obtained values exceed the predefined threshold values, the secure device may either repeat the authentication process to test whether the new obtained values correspond to the preceding ones or not or carry out a countermeasure.

The hardware parameters determined by the secure device comprise physical parameters pertaining to the electric functioning of the host device. These parameters comprise for example values of the power supply voltage and current, clock frequency, processor temperature, signal timing etc. Parameters related to the communication protocol between the secure device and the host device according to the ISO 7816 or ISO 14443 standards are also measured.

The software parameters determined depend on the activity of the processors or the chip sets of the host device during the progress of a data processing program. For example at scrambling descrambling data blocks, the secure device may determine a number of program instructions and the time required for a given cryptographic operation, the type and number of sub-routines used, the number of resets and tests having passed or failed etc.

The secure device determines generally a set comprising a mix of hardware and software parameters, which are compared with corresponding reference parameters previously stored in a memory of the secure device. The reference parameters are stored either stored at manufacturing of the secure device or preferably during a test session with a reference host device.

In other words the selection of hardware and software parameters corresponds to a "signature" of the host device which is compared to a reference "signature" stored in the non volatile memory of the secure device. These "signature" varies as well with the operations carried out by the host device as with the time if for example a time dependant parameter such as real time clock is taken account. The authentication is thus qualified as dynamic in contrast to static authentication like pairing mechanisms or other constant parameters tests of the prior art.

The comparison results of each hardware or software parameter increment decrement or let constant a value of a corresponding counter included in the secure device. The steps of determining the hardware or software parameters, comparing the parameters with their corresponding reference and modifying a counter associated to each parameter are preferably repeated to produce an accurate image of the behavior of the host device. The repetition may either occur periodically, at each start of the host device or upon a request transmitted in a message sent by an external unit.

The values of the different counters are read and compared with a predefined set of counter threshold values defined for a standard behavior of the host device. If some counter values diverge from the expected range, the secure device may judge that the behavior of the host device is abnormal. In such a case, the authentication process may be re-executed to validate or invalidate the obtained counter values or if necessary countermeasures preventing further processing of payload data by the host device may be carried out.

BRIEF DESCRIPTION OF THE DRAWINGS

The invention will be better understood thanks to the following detailed description which refers to the enclosed drawings given as non limitative examples.

DETAILED DESCRIPTION

According to a preferred embodiment, the host device HD consists of a pay TV set top box and the secure device SD consists of a smart card locally connected to the set top box via an appropriate card reader. The smart card comprises at least one chip set including a processor, a memory management unit, communication interfaces, random access and non volatile memories. Software loaded in the chip set is configured for monitoring the behavior of the set top box in various conditions of functioning such as starting, encrypting or decrypting multimedia data, control messages and rights management, etc. The monitoring aims to authenticate a set top box by the smart card to prevent use of unauthorized devices or illegal data processing programs running on authorized devices.

An advantage of the method is that it can be implemented on set top boxes already installed in the field. In fact, at first connection to the smart card, the set top box receives from the smart card the necessary data to update its firmware or in this case the conditional access kernel (CAK) in order to be able to exchange data with the smart card. This update thus renders the smart card compatible with the set top box which has to interpret in a correct way the commands and queries sent by the smart card during the authentication process.

According to an embodiment the set top box firmware update may be carried out on line, at connection of the smart card, by downloading the necessary data or messages from a managing center.

Once the smart card is connected and adapted to the set top box, the authentication mechanism may be activated remotely by the managing center, either globally for all set top boxes at a time, for a group or individually by addressing a particular set top box by a suitable identifier such as a serial number and/or smart card identifier. Groups may be defined by geographical areas, type or configuration of device, software version, smart card family, etc.

Figure 1:
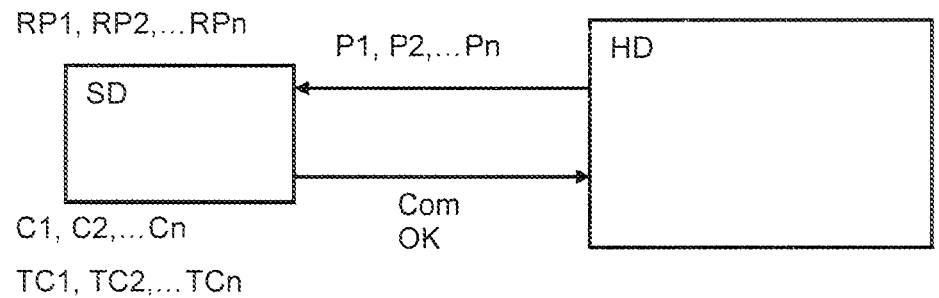
FIG. 1 shows an overview of a secure device locally connected to a host device which provides hardware or software parameters to the secured device for analyzing and comparing with reference values.
Figure 2:
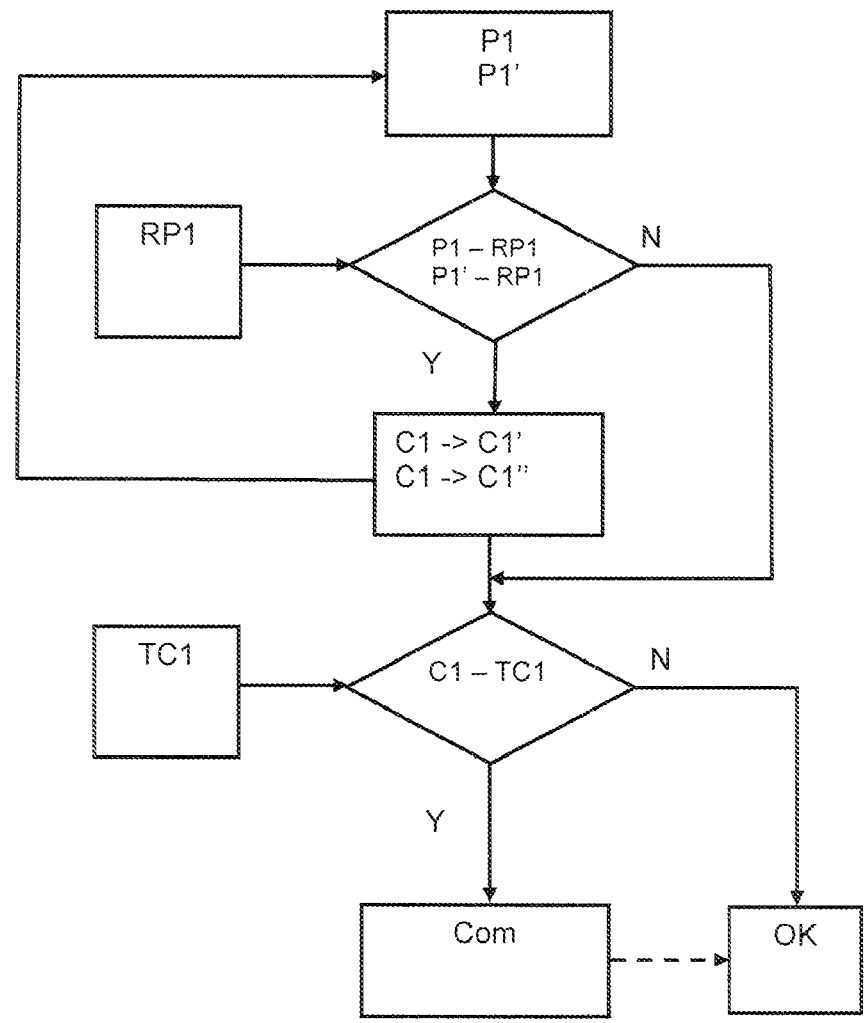
FIG. 2 shows a flow chart of the method of the invention carried out by the secure device for one hardware or software parameter of the host device.

The secure device SD determines at least one hardware or software parameter, but preferably a set comprising a mix of hardware and software parameters P1, P2, . . . Pn of the host device HD in working condition or for a specific operation mode. For example, authentication begins when the host device requests a key stored in the secure device, descrambles received data or at storing data on a disc, etc. Commands and queries are sent by the secure device SD to the host device HD which answers by returning instantaneous or average values of the functioning hardware and software parameters; see flowchart of FIG. 2.

The hardware parameters comprise physical parameters depending on the electric functioning of the host device such as values of the power supply voltage and current, clock frequency, processor temperature, and signal timing. Further hardware parameters are related to the communication protocol between the secure device and the host device according to standards:

ISO 7816, or ISO 14443 namely T=0 or T=1 i.e. character-level transmission protocol, respectively block-level transmission protocol, USB interface, namely conformity of application protocol data unit (APDU) sequences, transmission speed, data or blocks throughput, or other protocols such as SD (Secure Digital) or MMC (Multi Media Card) protocol.

The software parameters depend on the activity of the processor or the chip set of the host device during the progress of a data processing program. They are based on:

a number of program instructions and the time required for a given cryptographic operation for example, the type and number of sub-routines called, the number of resets and the source or cause of them, tests having passed or failed, number of accesses to the internal non-volatile memory of the secure device and/or host device, i.e. read/write operation in the memories, quantity of secure device functional or internal alarms, number of access to stored cryptographic keys, and operations executed with these keys.

periodicity of resets within a predetermined time period. A too high number of resets during the time period relative to a threshold may lead to countermeasures.

number of messages by type processed within a predetermined time period. A too high frequency over a threshold of a certain type of message may also lead to countermeasures.

These above mentioned hardware and software parameters are taken as non exhaustive examples. Many other parameters depending on the nature of the host device processor or chip set may be envisaged.

Furthermore, software parameters comprise sequences of messages issued from the data processing be the host device or rather the type and number of certain category of messages, the syntax of the messages or interfaces requested by the host device HD. The errors status returned by the secure device SD may also be taken account.

The selection of hardware and software parameters $P1, P2, \ldots, Pn$ to be determined by the secure device SD may also be based on a predefined host device authentication program loaded in the security device SD which executes a detection scenario carrying out a wrong protocol, false data or generates errors on the secure device. The secure device SD analyses corresponding reaction of the host device HD to these unexpected commands, requests or responses. The detection scenario may preferably variable in time, i.e. a different scenario is executed at different pre-programmed moments.

The secure device SD "knows" the behavior of an authorized host device by reference hardware and software parameters $RP1, RP2, \ldots, RPn$ stored in a non volatile memory. The determined parameters $P1, P2, \ldots, Pn$ are compared with the stored reference parameters and in case of differences, i.e. determined parameter lower or higher than the reference parameter, a counter $C1, C2, \ldots Cn$ associated to the concerned parameter is modified, i.e. incremented or decremented from an initial value. If the determined parameter $P1, P2, \ldots, Pn$ is equivalent to the reference parameter $RP1, RP2, \ldots, RPn$, the corresponding counter value remains unchanged i.e. the parameter test is considered as OK by the secure device SD.

To improve security of the data transmission between the secure device and the host device, a random number or nonce (a randomly generated cryptographic token) may accompany a command or a query sent by the secure device. Once this number has been received by the host device, it builds a response comprising at least the requested hardware or software parameter and the random number. According to an option, a mathematical function is carried out on the random number, said function being known to the secure device. Thus the number received is either the random number itself or a direct function of the random number. The aim is to ensure that the random number received corresponds to the random number generated by the secure device. When these two random numbers are different, the secure device can also enable countermeasures similar to the ones activated when authentication fails. Thanks to the presence of this random number in the data exchanges at authentication, every unauthorized reproduction attack or replay attack is prevented. A response to a request sent by a secured device coming from a given host device cannot be transferred to another host device. A response sharing is thus also avoided.

In order to improve accuracy of the comparison by taking account variation of the parameters, the determination of the parameter and comparison with the reference parameter is preferably repeated several times either periodically, or at each start of the host device or of a particular operation thereof or even upon a request transmitted by a message sent by an external unit. For example, in the filed of pay TV, management messages EMM are sent by broadcasters to update user rights in the secure device. At this opportunity, host device authentication may also be initiated to verify conformity of hardware and software.

At each repetition time the counter is modified in the direction of the variation and may return to the initial value when parameter high values compensate parameter low values. Each counter $C1, C2, \ldots Cn$ has a threshold value $TC1, TC2, \ldots, TCn$ specific to the host device HD. Depending on the counter values reached after several parameters tests, the secure device SD sends a command Com to the host device HD enabling either further processing or a specific action. If the counter values correspond to expected ones for an authorized host device, the secure device authorize further processing (OK status). Otherwise, when one or several counters shows abnormal or unusual values, the secure device SD may restart the authentication process from the beginning by the parameters determination to validate or invalidate the "wrong" results before executing countermeasures.

According to an option, countermeasures are carried out as soon as the values of the counters are out of range. These countermeasures may act as well on the secure device as on the host device such as limiting access to payload data, disabling user rights, blocking communication between the secure device and the host device, putting out of service the secure device and/or the host device.

According to an embodiment some counters may be associated to a subset of the set of the determined hardware or software parameters so that these counters are modified when at least one hardware or software parameter of the subset is different from the corresponding reference parameter.

According to a further embodiment a tolerance may be set up in the configuration of the counters or their sensitivity to parameters variations is lowered. The value of such a counter related to one or a set of hardware and software parameters is modified only after a predetermined number of differences logged by comparing the determined hardware or software parameters with the corresponding reference parameters during a plurality of time periods.

According to a further embodiment, the hardware and software parameters are determined at predefined time intervals and the duration of their variations are recorded duration of the variations of said parameter. The corresponding counter is then modified when the duration differs from a reference duration.

According to a further embodiment the secure device filters the values of the counters associated to the hardware and software parameter of the set to keep only counter values selected according to predefined criteria. For example, among the determined parameters, the secure device selects only the counter values corresponding to the most critical parameters involved in secure operation executed by the host device. For example, a number of accesses and using keys from a memory to decrypt data should be limited to a value excluding tampering attempts.

The filtering criteria are preferably defined by a type of data processing program executed by the host device to obtain a selection of hardware and software parameters specific to the behavior of said data processing program. To improve security and increase difficulty of reverse engineering of the secure device functionalities, the filtering criteria may also be variable in time so that not always the same parameters are tested.

The authentication data including specific hardware and software parameters and the counters filtering criteria are stored in the secure device and may be exported to another device (computer) for various purposes such as: real time analyzing in a context of production quality evaluation, for statistical handling or for filtering criteria optimization.

The invention claimed is:

1. A system for authenticating a host device with a secure device comprising:
   a host device; and
   a removable secure device locally connected to said host device through a local connection interface;
   wherein said secure device comprises at least one processor configured for monitoring the host device by handling a plurality of hardware and software parameters specific to the operating behavior of the host device, the hardware parameters including parameters pertaining to the electric functioning of the host device, the software parameters depending on operating of data processing programs implemented in the at least one processor and associated memories of the host device, the security device further comprises a non volatile memory associated with the at least one processor, for storing a plurality of reference hardware and software parameters, wherein the secure device is configured for authentication of the host device by performing the steps of:
   a) determining at least one hardware or software parameter specific to an operating behavior of the host device;
   b) comparing the at least one hardware or software parameter with a corresponding reference hardware or software parameter stored in the non volatile memory;
   c) according to a result of step b), modifying or leaving unchanged a value of a counter associated with the at least one hardware or software parameter;
   d) repeating the steps a) to c) after at least one time period;
   e) after the at least one time period, reading the value of the counter; and
   f) determining an operating mode of the system based on a comparison of the value of the counter with a predefined counter threshold value specific to the host device, the operating mode of the system comprising one of further processing, repeating authentication process, or executing countermeasures by the secure device and/or the host device.

2. The system according to claim 1, wherein the secure device is configured to determine a set of parameters comprising at least one hardware and at least one software parameter, said set being compared with a corresponding set of reference hardware and software parameters previously stored in the non volatile memory of the secure device.

3. The system according to claim 2 wherein the secure device comprises a counter associated with a subset of the set of hardware and software parameters, said counter being modified when at least one hardware or software parameter of the subset is different from a corresponding reference parameter.

4. The system according to claim 1, wherein the secure device is configured to perform repetition of steps a) to c) periodically.

5. The system according to claim 1, wherein the secure device is configured to perform repetition of the steps a) to c) at each start of the host device.

6. The system according to claim 1, wherein the secure device is configured to perform repetition of the steps a) to c) at a specific operation carried out by said secure device.

7. The system according to claim 1, wherein the secure device is configured to perform repetition of the steps a) to e) upon a request transmitted in a message sent by an external unit.

8. The system according to claim 1, wherein the value of a counter related to one or a set of hardware and software parameters is modified only after a predetermined number of differences are logged by comparing the hardware or software parameters with the corresponding reference hardware or software parameters during a plurality of time periods.

9. The system according to claim 1, wherein the secure device is configured to determine a set of hardware and software parameters for a specific operating mode of the host device.

10. The system according to claim 1, wherein the secure device is configured to determine a specific hardware and software parameter at predefined time intervals and records a duration of the variations of said parameter, the counter being modified when said duration differs from a reference duration.

11. The system according to claim 1, wherein the hardware parameters comprise physical parameters selected from a group consisting of a value of the power supply voltage, a value of the supply current, a clock frequency, a processor temperature, and a signal timing.

12. The system according to claim 1, wherein the hardware parameters comprise parameters related to the communication protocol between the secure device and the host device according to the ISO 7816, ISO 14443 standards or other protocols.

13. The system according to claim 1, wherein the software parameters depend on activity of the at least one processor or chip sets of the host device during progress of a data processing program.

14. The system according to claim 10, wherein the software parameters comprise parameters selected from the group consisting of a number of program instructions and time required for a given cryptographic operation, a type and number of sub-routines called, a number of read/write operations on the non volatile memory of the secure device, a number of resets and their cause, and tests having passed or failed.

15. The system according to claim 2, wherein the secure device is configured to filter the values of the counters associated with the hardware and software parameters of the set to keep only counter values selected according to predefined criteria for determining an operating mode of the system comprising one of further processing, repeating authentication process or executing countermeasures by the secure device and/or the host device.

16. The system according to claim 15, wherein the secure device is configured to define the filtering criteria by a type of data processing program executed by the host device, the selected hardware and software parameters being specific to the behavior of said data processing program.

17. The system according to claim 15, wherein the filtering criteria are variable in time.

18. A method for authenticating a host device with a removable secure device locally connected to said host device through a local connection interface, said secure device comprising at least one processor configured for monitoring the host device by handling a plurality of hardware and software parameters specific to the operating behavior of the host device, the hardware parameters including parameters pertaining to the electric functioning of the host device, the software parameters depending on operating of data processing programs implemented in the at least one processor and associated memories of the host device, the secure device further comprising a non volatile memory associated with the at least one processor for storing a plurality of reference hardware and software parameters, the method comprising the secure device performing the steps of:
   a) determining at least one hardware or software parameter specific to an operating behavior of the host device:
   b) comparing the at least one hardware or software parameter with a corresponding reference hardware or software parameter stored in the non volatile memory;
   c) according to a result of step b), modifying or leaving unchanged a value of a counter associated with the at least one hardware or software parameter;
   d) repeating the steps a) to c) after at least one time period;
   e) after the at least one time period, reading the value of the counter; and
   f) determining an operating mode of the system based on a comparison of the value of the counter with a predefined counter threshold value specific to the host device, the operating mode of the host device and the secure device comprising one of further processing, repeating authentication process, or executing countermeasures by the secure device and/or the host device.

19. The method according to claim 18, wherein the secure device determines a set of parameters comprising at least one hardware and at least one software parameter, said set being compared with a corresponding set of reference hardware and software parameters previously stored in the non volatile memory of the secure device.

20. The method according to claim 19, wherein the secure device comprises a counter associated with a subset of the set of hardware and software parameters, said counter being modified when at least one hardware or software parameter of the subset is different from a corresponding reference parameter.

21. A removable secure device configured to authenticate a host device connected to the secure device through a local connection interface, said secure device comprising at least one processor configured for monitoring the host device by handling a plurality of hardware and software parameters specific to the operating behavior of the host device, the hardware parameters including parameters pertaining to the electric functioning of the host device, the software parameters depending on operating of data processing programs implemented in the at least one processor and associated memories of the host device, the secure device further comprises a non volatile memory associated with the at least one processor for storing a plurality of reference hardware and software parameters, wherein the secure device is configured to perform the steps of:
   a) determining at least one hardware or software parameter specific to an operating behavior of the host device;
   b) comparing the at least one hardware or software parameter with a corresponding reference hardware or software parameter stored in the non volatile memory;
   c) according to a result of step b), modifying or leaving unchanged a value of a counter associated with the at least one hardware or software parameter;
   d) repeating the steps a) to c) after at least one time period;
   e) after the at least one time period, reading the value of the counter; and
   f) determining an operating mode of the system based on a comparison of the value of the counter with a predefined counter threshold value specific to the host device, the operating mode of the secure device and the host device comprising one of further processing, repeating authentication process, or executing countermeasures by the secure device and/or the host device.

22. The secure device according to claim 21, wherein a set of parameters comprising at least one hardware and at least one software parameter is determined, said set being compared with a corresponding set of reference hardware and software parameters previously stored in the non volatile memory of the secure device.

23. The secure device according to claim 22, wherein a counter is associated with a subset of the set of hardware and software parameters, said counter being modified when at least one hardware or software parameter of the subset is different from a corresponding reference parameter.

* * * * *